United States Patent
Lang et al.

(10) Patent No.: US 6,213,666 B1
(45) Date of Patent: Apr. 10, 2001

(54) PRODUCTION OF RELEASABLE SLEEVE SECTIONS

(75) Inventors: Werner Lang, Weinheim; Siegbert Vial, Rossdorf; Erich Gantzert, Gross-Bieberau, all of (DE)

(73) Assignee: Merz & Krell GmbH & Co., Gross-Bieberau (DE)

( * ) Notice: Subject to any disclaimer, the term of this patent is extended or adjusted under 35 U.S.C. 154(b) by 0 days.

(21) Appl. No.: 08/973,450
(22) PCT Filed: May 23, 1996
(86) PCT No.: PCT/DE96/00903
   § 371 Date: Nov. 20, 1998
   § 102(e) Date: Nov. 20, 1998
(87) PCT Pub. No.: WO96/37356
   PCT Pub. Date: Nov. 28, 1996

(30) Foreign Application Priority Data

May 24, 1995 (EP) .................................................. 95108034

(51) Int. Cl.$^7$ ....................................................... B43K 5/00
(52) U.S. Cl. ...................... 401/251; 401/208; 264/328.1; 264/334; 264/336
(58) Field of Search .................................... 401/209, 251, 401/208, 217; 264/328.1, 334, 318, 336

(56) References Cited

U.S. PATENT DOCUMENTS

| | | | |
|---|---|---|---|
| 3,055,341 | * 9/1962 | Riepe | 401/209 |
| 3,424,831 | 1/1969 | Spatz | 264/138 |
| 3,756,733 | * 9/1973 | Glasa et al. | 401/259 |
| 3,802,788 | * 4/1974 | Danjczek | 401/194 |
| 4,025,204 | * 5/1977 | Hobbs | 401/109 |
| 4,092,073 | 5/1978 | Anderson | 401/209 |
| 4,780,016 | * 10/1988 | Kim | 401/117 |
| 4,806,301 | * 2/1989 | Conti | 264/334 |
| 4,923,227 | 5/1990 | Petty et al. | 285/319 |
| 5,041,256 | 8/1991 | Petty et al. | 264/318 |
| 5,059,077 | 10/1991 | Schmid | 411/400 |
| 5,094,482 | 3/1992 | Petty et al. | 285/319 |
| 5,114,655 | 5/1992 | Cole | 264/318 |
| 5,780,130 | * 7/1998 | Hansen et al. | 428/35.7 |

FOREIGN PATENT DOCUMENTS

| | | | |
|---|---|---|---|
| 0031150 | 12/1980 | (EP) . | |
| 0054681 | 10/1981 | (EP) . | |
| 0672511 | 3/1995 | (EP) . | |
| 1575034 | 9/1980 | (GB) . | |
| 92/01546 | * 2/1992 | (WO) | 264/328.1 |
| 96903 | 11/1996 | (WO) . | |

* cited by examiner

Primary Examiner—Henry J. Recla
Assistant Examiner—Tuan Nguyen
(74) Attorney, Agent, or Firm—Duane, Morris & Heckscher LLP

(57) ABSTRACT

A conical thread structure $\alpha 1, \alpha 2, t$ is provided to simplify the removal of threads in plastics sleeve elements 1,2,3,4 and to decrease production cost. The radial distance of the thread elements 50,60,51,61 of said thread structure and of the corresponding form tools, which elements being adjacent in translational z or −z direction, are dimensioned such that, when removed E0,E1,E2 or F0,F1 from the mold each thread element "snaps out" only once and does not snap into a second time.

8 Claims, 8 Drawing Sheets

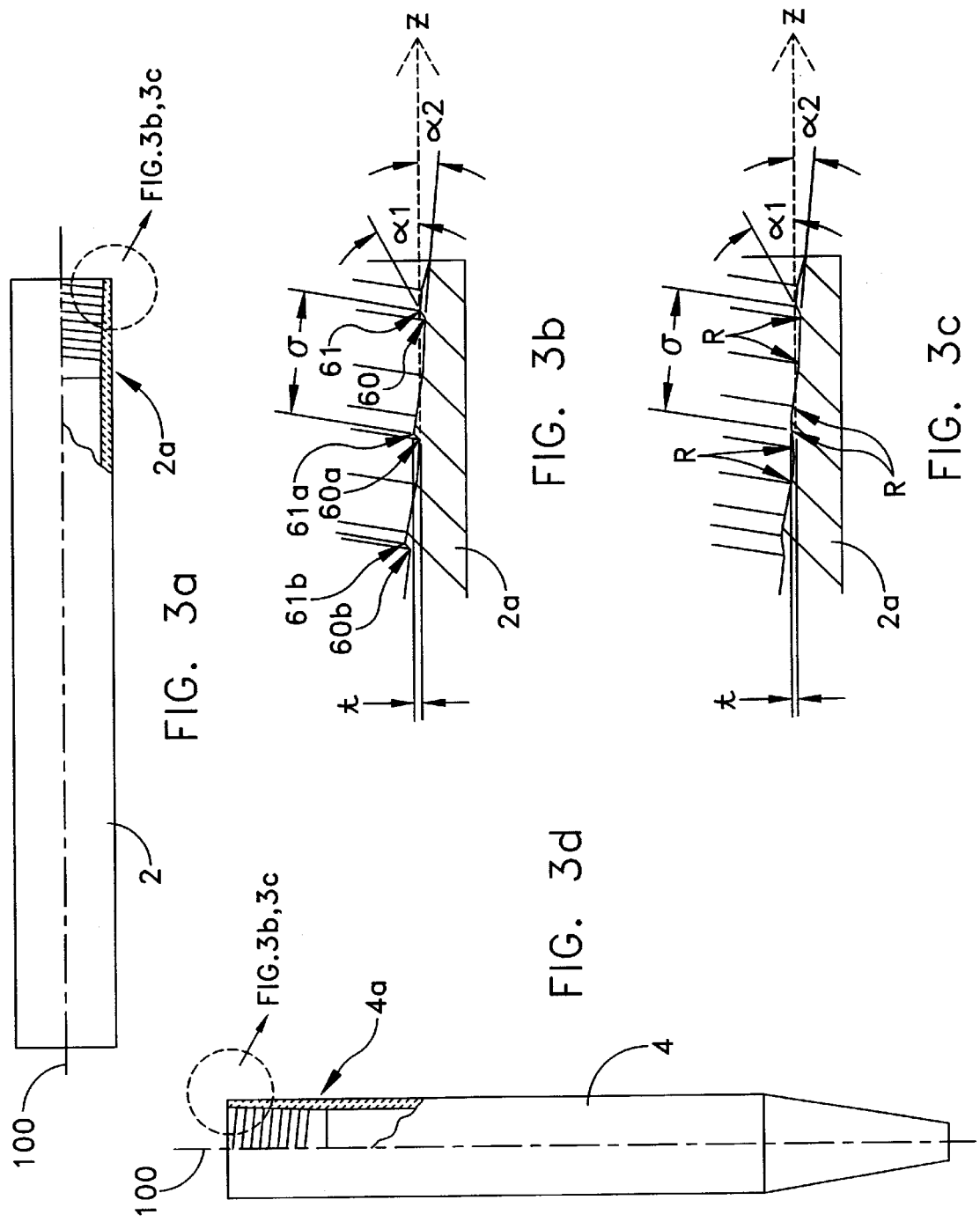

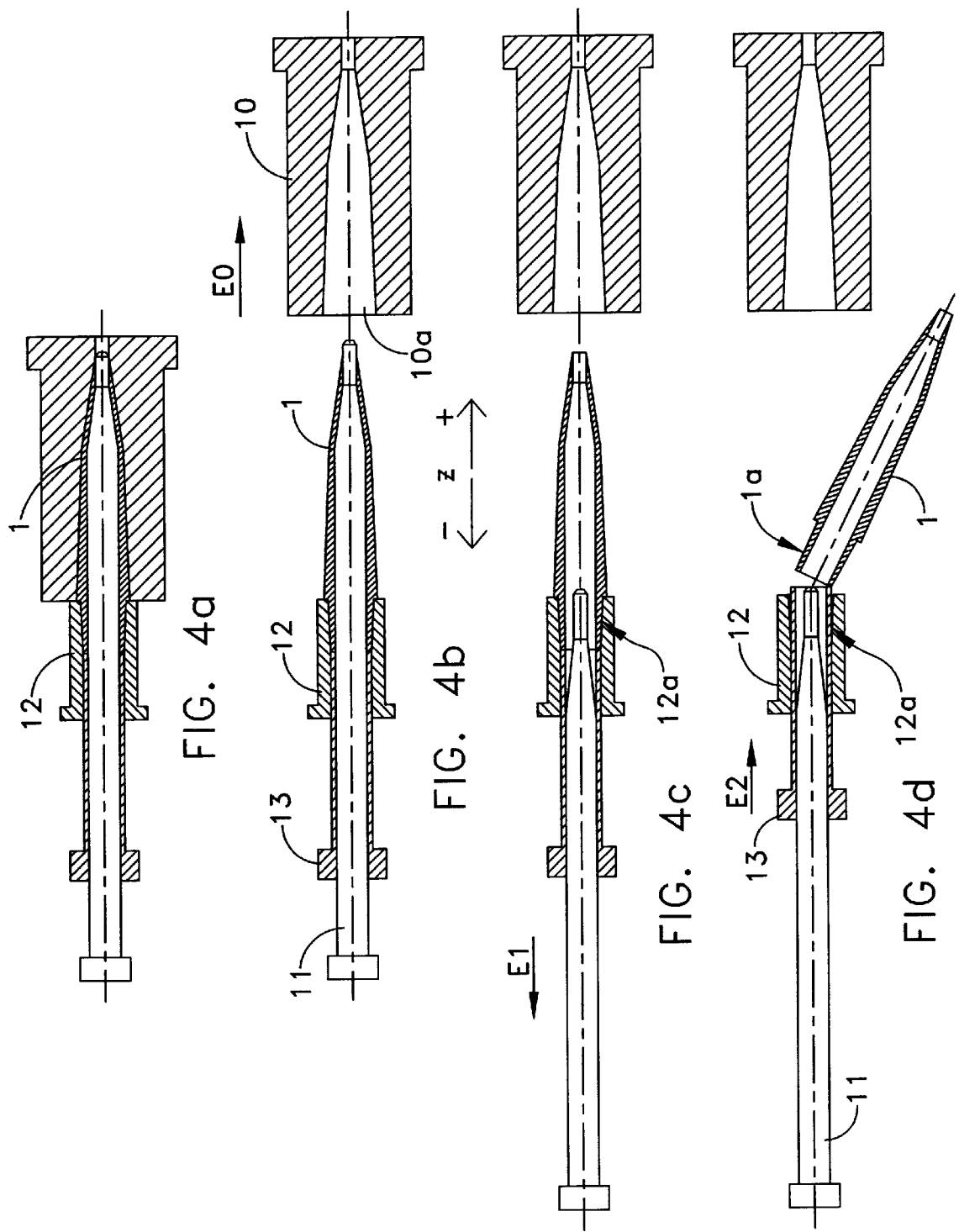

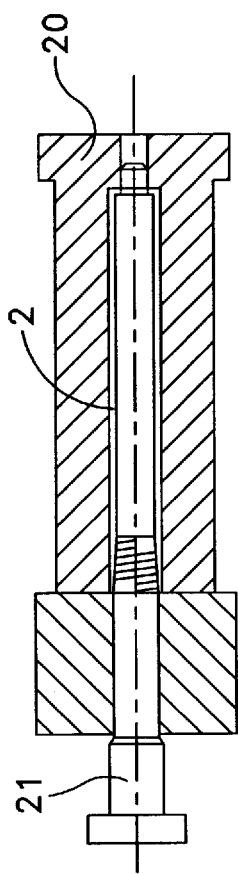
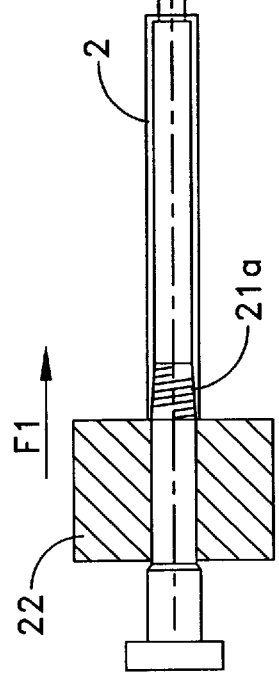
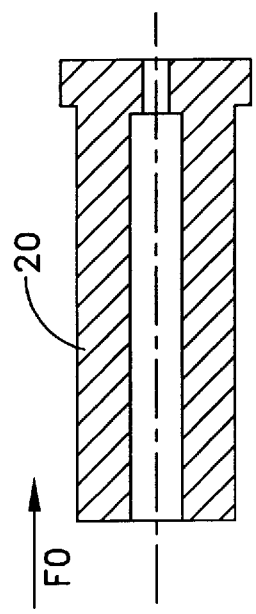
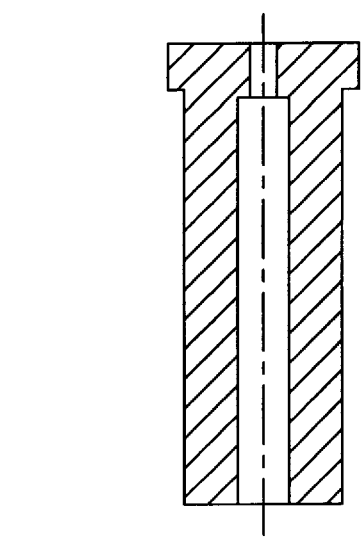
FIG. 5a  FIG. 5b  FIG. 5c

PRODUCTION OF RELEASABLE SLEEVE SECTIONS

The invention relates to the simplified production of connectable sleeve-shaped elements which are produced by injection molding and may easily be secured and released (by screwing).

So far, sleeve-shaped plastics elements have been secured either by screw connections (thread joints) or by snap-in lockings (bayonet joints).

(a) Screw connections (thread joints) have the advantage to be easily releasable. Each consumer is familiar with their application. The substantial disadvantage of such connection is its relatively expensive production. For the production of parts with outer or inner threads by injection molding, tools are required, which, in addition to the pure translational opening movement of the injection molding machine, carry out further translational or rotary movements to be able to separate the thread contour of the injection molded part from its tool. Due to the greater number of elements and to the additional separating (detaching) movement, these tools are expensive and susceptible to failure. Moreover, due to the additional relative movement for removal, a longer cycle period in the production process is required, which period increases the production cost.

(b) Snap-in lockings have circumferential or segmental grooves, webs or ribs ("snap-in contours") on rotationally symmetrical or polygonal sleeves. Usually, said snap-in lockings may be produced at a lower cost than screw connections, because no additional rotary removing movement is required to detach the snap-in contours from their mold. Partly, however, tools are used for the production of the parts, which tools—in addition to the translational opening movement of the injection molding machine—execute further translational movements to separate the snap-in contours from their mold and which, for this reason, are expensive. Snap-in connections have the principle disadvantage that the force serving for locking of the parts to be joined has to be overcome when disengaging them. Snap-in lockings always realize a compromise between best possible solidity and least possible loosening force: None of the two requirements may be optimized without deteriorating the other. In order to ensure reproducible holding and loosening forces, smaller tolerances than for screw connections have to be observed during production, which increases the production cost. When disengaging the snap-in locking, the snap-in geometry is partly deformed so that the holding force is reduced after several times of snapping-out and snapping-in—i. e. during use. Additionally, the functioning of said snap-in connections is not comprehensible for many consumers and therefore is not recognized to be a detachable connection, the possibility of multiple use of refillable instruments, particularly ball-point pens or ink writers, remaining unused.

The object of the invention is to provide a releasable securing of sleeve elements, said securing being easy to produce and easy to detach, but nevertheless having a high holding force when engaged.

This is achieved according to claim 1.

The helical or spiral webs or ribs, segments or segmental parts are located on a conical envelope surface, the depth of its connecting contour (web or segment) having a defined ratio with respect to the angle of inclination of the envelope surface and being provided such that the connecting contour may be separated from its mold by slightly ductile or elastic deformation. This is achieved by providing every undercut (yielding a projection of the connecting contour) in such a way that the connecting contour formed from it—when being separated from the mold while moving in separation direction +z or −z—will not "snap into" an other undercut of the tool again.

Claim 3, 4, 7.

Instead, it is elastically—or slightly plastically—lead past the next or the next but one form tool projection respectively, whereby claim 7 is to be read easier when regarding FIG. 8 and starting from a form tool projection which is further inside the thread structure.

Claim 5.

According to the invention, the separation by screwing (time-consuming) or the separation by followers moving apart (expensive) is replaced by substantially only translational removal (in direction of the axis z), although the separated part is a part to be joined or engaged by turning.

Claim 6.

All kinds of thread elements may be used. In order to further simplify the removal, said thread elements may have rounded edges or tops.

The connection (securing) provided by the invention comprises at least one of said thread elements, so that a simultaneously firm and easily releasable connection of the sleeves is achieved already by applying one turn. Despite the one turn, all thread turns (for example 10) are in simultaneous engagement and realize a connection which, on the one hand, is joined almost as fast as a bayonet joint (but with substantially larger turning angle) and, on the other hand, produces substantially the same holding forces, a usual cylindrical thread provides (but with substantially reduced turning angle).

Thus, the invention provides a quick-connecting thread of sleeves or sleeve elements for the production of writing instruments, additionally being inexpensive.

The sleeve elements being produced with the apparatus or with the process may be described as having a "conical thread section". The thread root is provided on a surface inclined with respect to the separation axis, which surface being a hypothetical surface, as it has to be regarded as a connection cone of a helical or spiral thread root line. Said thread root line is slant and its inclination is adapted to the height of the thread webs such that a first thread web height has substantially the same radial dimension as the next but one (the one after the next) thread root, so that—in separation direction +z or −z—a thread web is only once plastically or elastically deformed at the form tool projection forming it and, thereafter, will not again be deformed permanently by the adjacent form tool projection, particularly may be lead past it without or with only slightly contacting it.

The continuous thread may also be designed in bayonet form. A number of circumferentially spaced thread elements—thread webs, thread segments or thread points—being located in axial direction one after the other on an inclined basic surface, so that the thread elements are located on continuously (negatively) offset radial levels in order to fulfill the aforementioned condition that a thread element provided by a form tool is stressed only once when removing it from its mold.

The invention is described in detail by schematic drawings on the basis of several embodiments. The reference numerals presented throughout this specification and in the figures have been included in the appended claims for clarity of definition, and are not intended to limit the scope of the claims.

FIG. 3a, shows the conical inner thread contour 2a on a cylindrical gripping sleeve or shaft 2;

Figure 1A:
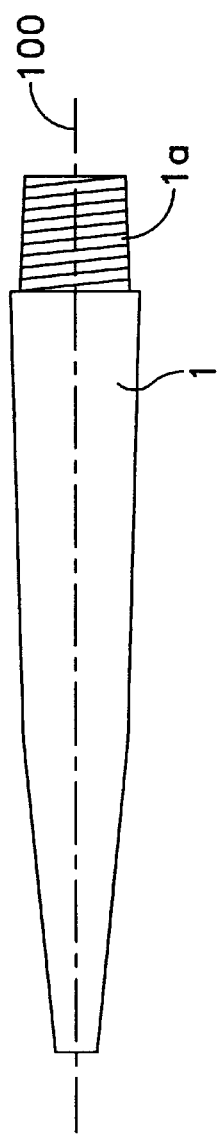
FIG. 1a, FIG. 1b, FIG. 1c and FIG. 1d are embodiments of thread elements 1a, 1a', 1a", 1a* on a gripping sleeve of a ball-point pen, which thread elements are connectable by screwing in a turning movement.

FIG. 3d shows the same contour 4a on a conically ending front sleeve element 4 being securable at its rear end by head (end) piece 3.

FIG. 3b, FIG. 3c are sectional views of embodiments of thread profiles of FIGS. 3a,3d.

FIG. 4a, FIG. 4b, FIG. 4c and FIG. 4d are different instantaneous views showing in longitudinal section the separation of an outer thread 1a from its mold according to the invention. The relative movements are represented by E0,E1,E2.

FIG. 5a, FIG. 5b and FIG. 5c are different instantaneous views showing in longitudinal section the separation of an inner thread 2a from its mold. The relative movements are represented by F0 and F1.

Figure 2D:
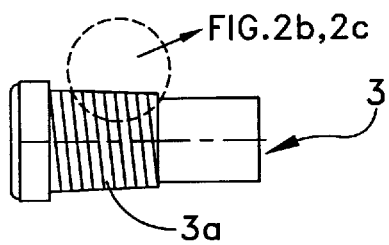
FIG. 2d shows the same contour 3a on a rear end piece 3 of a writing instrument—which end piece may be secured by turning in, in a countersunk or concealed manner as well.
Figure 2A:
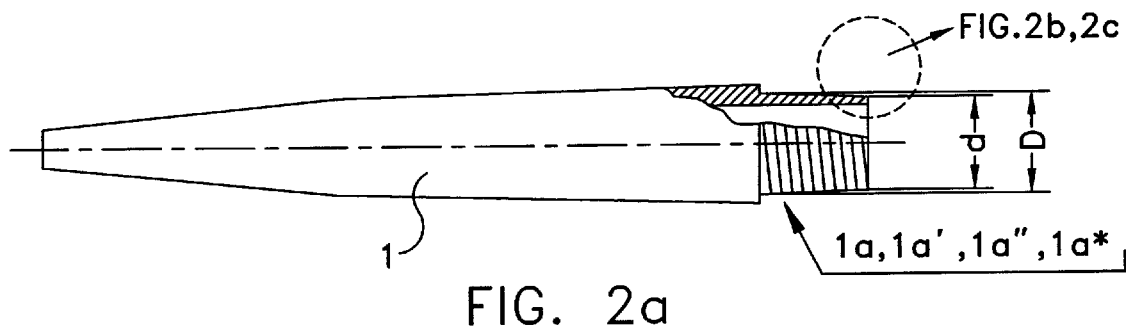
FIG. 2a shows the conical outer thread contour 1a on another gripping sleeve 1, with a broken-out section and diameters d,D (max/min) of the thread root and the thread web.
Figure 6A:
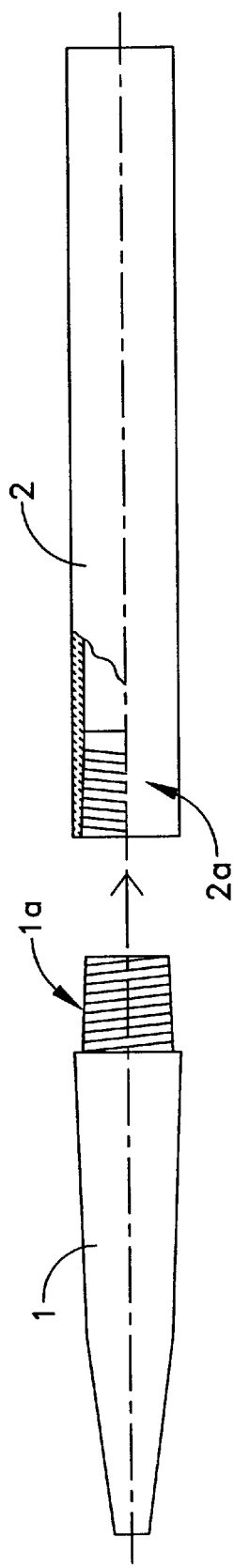
Figure 6B:
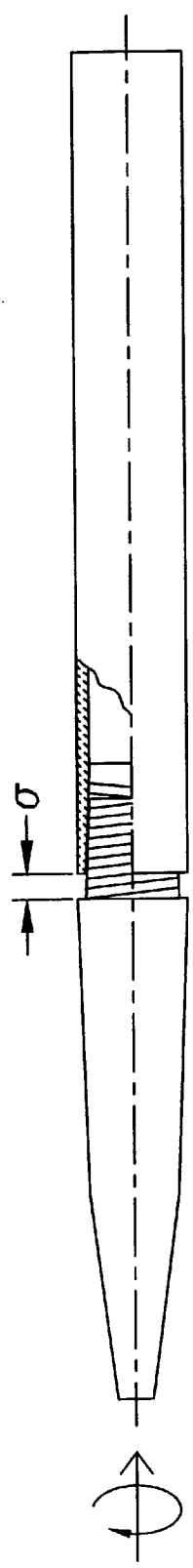
Figure 6C:
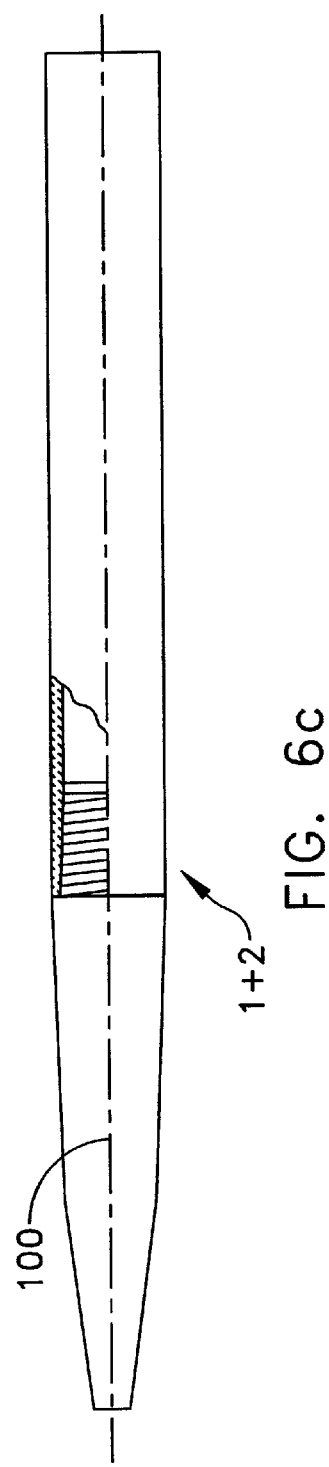

FIG. 6a, FIG. 6b and FIG. 6c are different instantaneous views in longitudinal section showing an inner thread 2a, secured in a turning manner to an outer thread 1a both being provided on sleeve elements 1,2 (securing of sleeves according to FIGS. 2a,3a).

Figure 7A:
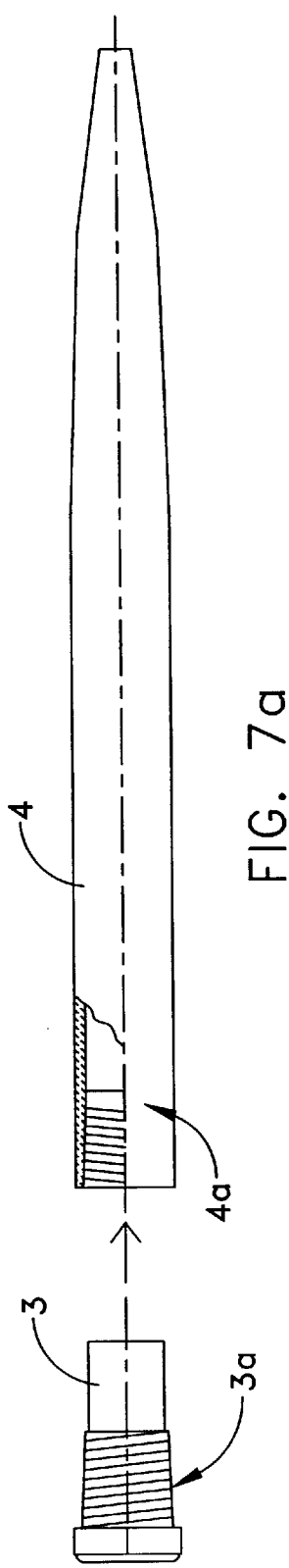
Figure 7B:
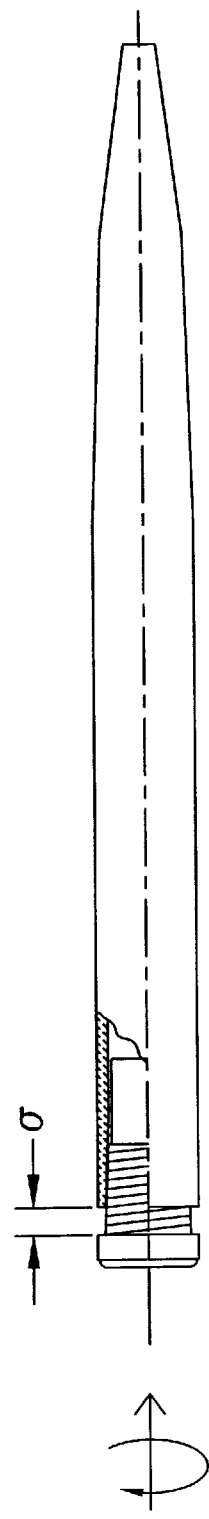
Figure 7C:
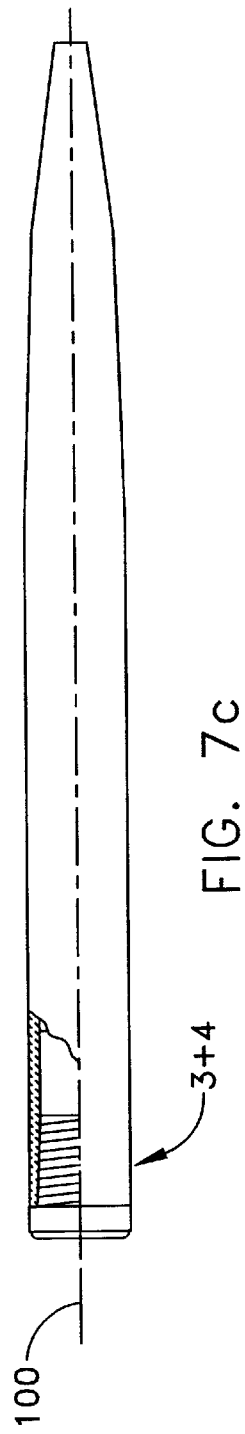

FIG. 7a, FIG. 7b and FIG. 7c are different instantaneous views of sleeve elements 3,4 in longitudinal section showing an inner thread 4a being connected to an outer thread 3a according to the invention (connection of sleeve elements according to FIG. 2d,3d).

Figure 8:
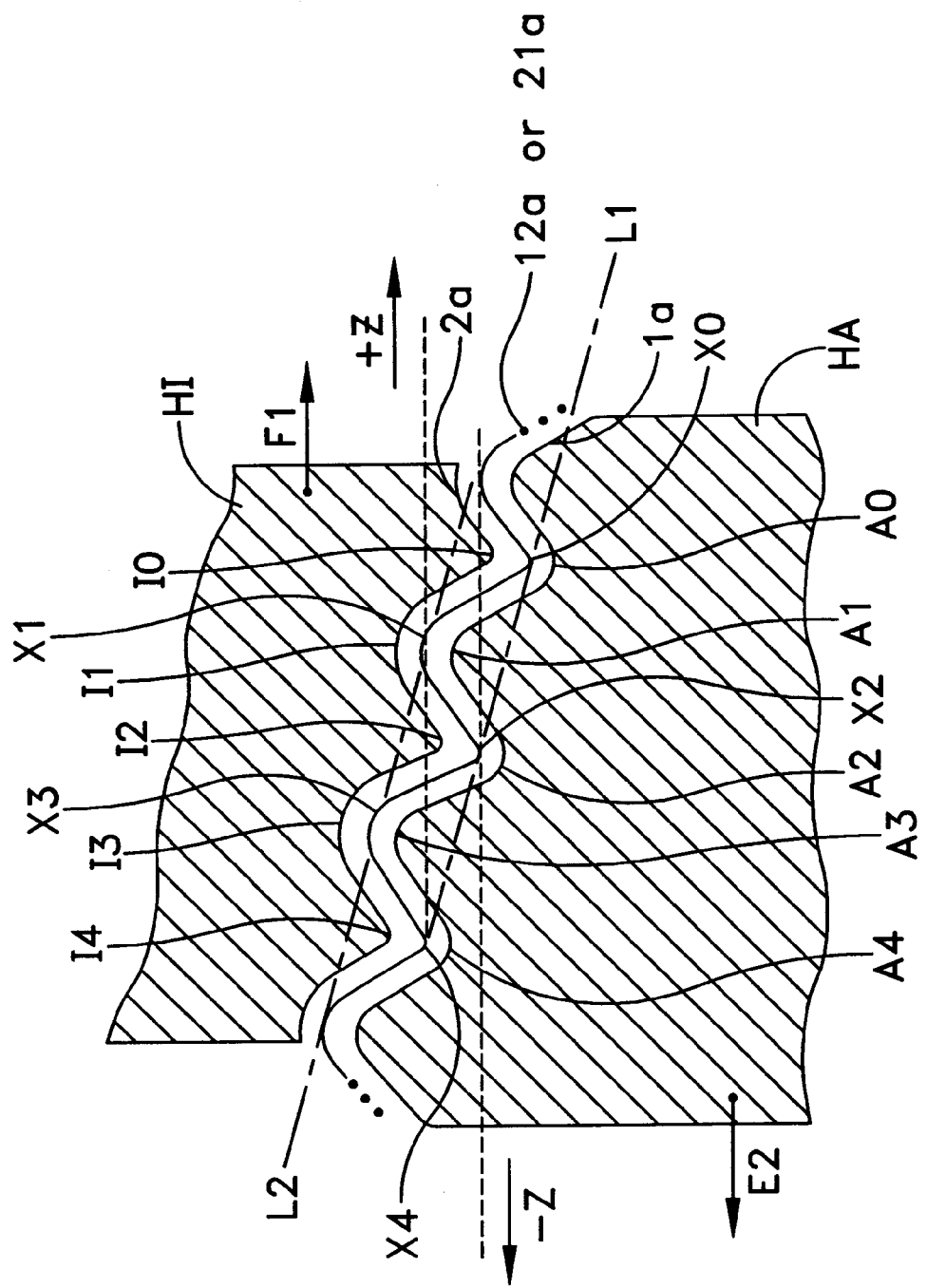

FIG. 8 is a schematic (simultaneous) sectional view illustrating the thread structure of an inner thread I1,I2,I3,I4 on a sleeve HI and the thread-forming tool 12a with its outer surface as well as the thread contour of an outer thread A1,A2,A3,A4 of a sleeve HA with its thread-forming tool contour 21a which is located on the inner surface of the molding line/surface 12a/21a. Despite being illustrated as a line, said molding surface 12a is a representation of said tool 12a according to FIG. 4d as well as of said tool 21a according to FIG. 5c.

The connection 1/2 or 3/4 (see FIGS. 6a, 6b, and 6c, and 7a, 7b, and 7c) may be produced at a low cost with injection molding tools of simple structure. The elements may rapidly and easily be connected by screwing after having been pushed together in axial direction beforehand.

Figure 1B:
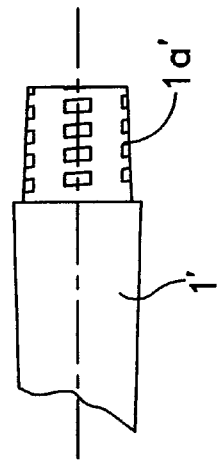
Figure 1C:
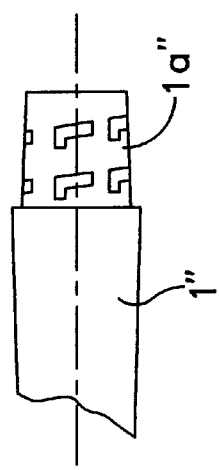

The securing (connecting) system comprises a helical or spiral rib or web (FIG. 1a)—being provided on a cylindrical or conical outer and/or inner contour. Said rib or web may as well be discontinuous and consist of segments (FIG. 1b). Said segments may as well be only partly helical (FIG. 1c). The contour and height of said thread elements is designed such that they are separable from their mold by simple injection molding tools. The molding parts of the tool exclusively move in z direction, the opening direction of the injection molding machine (FIGS. 4a, 4b, 4c, and 4d and FIGS. 5a, 5b, and 5c show the contour-giving or molding sections of two tools for the production of the two sleeve connection elements).

Figure 1D:
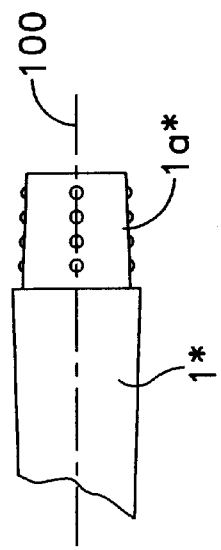

The helically or spirally extending naps, points 1a*, segments 1a' or segmental elements 1a" may as well be located on only one of the two sleeve elements to be joined, if not helically shaped contours 1* engaging them are provided on the other connection element (FIG. 1d).

Said helically disposed naps, points, segments or segmental elements are located on a conical basic surface, the depth of the connection contour (web or segment) of which has a defined relation with respect to the angle of inclination of the basic surface and is provided such that the connection contour may be separated from its mold by elastic deformation. This is achieved by only once translationally separating the connection contour past each undercut.

Separation from the mold is effected only once, if the following relations are applied (FIGS. 2a, 2b, 2c, and 2d and FIGS. 3a, 3b, 3c, and 3d):

$\epsilon_m$ [%] possible material expansion of the plastics material of the sleeves.

D [mm] largest diameter of the conical sleeve 1a, 2a.

d [mm] smallest diameter of the conical sleeve 1a, 2a.

t [mm] depth of the web.

σ [mm] helical pitch or web distance.

$\alpha_1$ [°] removal angle.

$\alpha_2$ [°] inclination angle in the sleeve 1a, 2a.

$$t = d \cdot \epsilon_m / 200 \qquad 1.$$

d is given by the constructive dimensions, $$\alpha_2' = \arcsin(t/\sigma) \qquad 2.$$

σ has to be selected according to functional requirements.

$\alpha_2 \geq \alpha_2'$

Figure 2B:
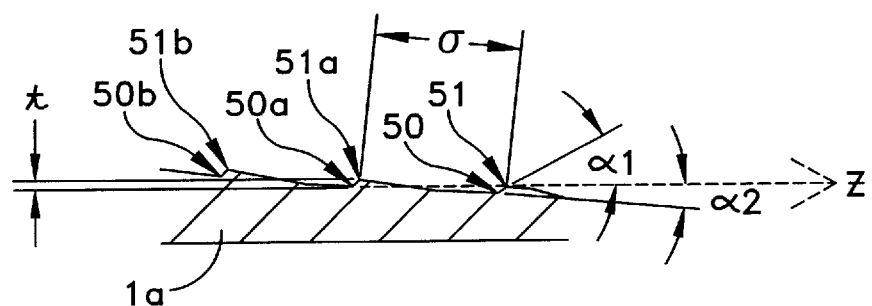
FIG. 2b, FIG. 2c are sectional views of embodiments of thread or rib profiles of FIGS. 2a,2d.
Figure 2C:
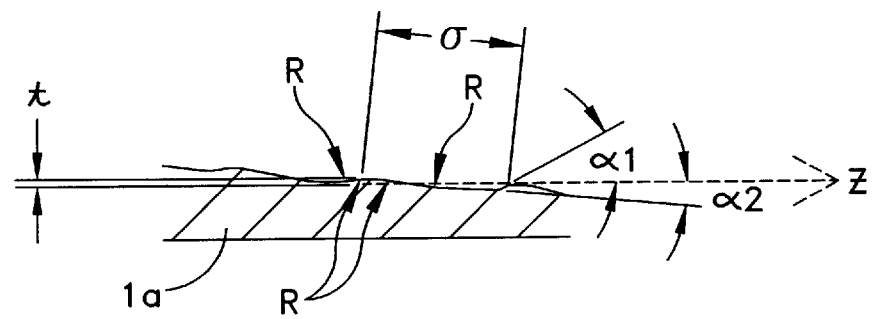

FIG. 2a shows the conical outer contour, FIGS. 2b and 2c are sectional views of web profiles. FIG. 3a shows the conical inner contour, FIGS. 3b and 3c are sectional views of web profiles.

The possible material expansion $\epsilon_m$ is dependent on the plastics material, the separation angle $\alpha_1 < 90°$ and the separation radii R. The possible web depth t results from $\epsilon_m$ and d according to equation 1. A dimensioning angle $\alpha_2'$ is obtained according to equation 2 from t and the desired pitch or the desired web distance σ.

The inclination angle $\alpha_2$ of sleeve element 1a/3a or 2a/4a of sleeve 1 or 2 or 3 or 4 should in ideal circumstances be larger than or equal $\alpha_2'$. If it is selected to be larger, the turning or screwing connection (after initially pushing one sleeve element axially into the other) requires a smaller turning angle for securing; if it is selected to be smaller, separation of the sleeve from its mold approaches repeated snapping in and out. Thus, the dimensioning angle $\alpha_2'$ may be interpreted as "angle limit".

If a non-elastic plastics material is selected, $\alpha_1$ is more acute (FIG. 2c) than if a more elastic plastics material is used (FIG. 2b).

The forming contour on the form tool is dimensioned such that a thread element (web 51/61 with adjacent groove or recess 50/60) is radically offset with respect to the thread element adjacent at a distance a (thread pitch). Usual threads—which are difficult to detach—do not have a radically differing dimension. The conical thread section 1a,2a, 3a,4a results from the radically differing dimension recurring periodically throughout the length of the thread.

FIGS. 2a, 2c and 3b, 3c show a thread element for an outer and an inner thread respectively. The thread elements 50/51 are disposed one after the other in axial direction or in separation direction z respectively; next to them 50a, 51a are located, followed by 50b, 51b, and, in the same structure, the inner thread according to FIG. 3b is arranged with its thread elements 60,61, followed by the next thread element 61a, 60a being adjacent thereto contrary to the separation direction z, and the next but one thread element 60b,61b. All said thread elements have further dimensions t, σ and the two specification angles $α_1,α_2, α_{2'}$ defining the cone for the basic surface of the thread and the inclined shape of the thread.

The dimensions for these values are defined by the above mentioned equations (1) and (2) and the separation angle $α_1$ is substantially dependent on the plastics material used. If a simplified removal is desired for harder plastics materials, the sharp transitions and edges in the thread elements 50/51 and 60/61 according to FIGS. 2b and 3b may be rounded, for which purpose a number of radii R are indicated in FIGS. 2c and 3c.

The separation movement of an outer thread is described in FIGS. 4a, 4b, 4c, and 4d by instantaneous views. The above described thread section is molded by a thread-forming sleeve 12, which is located closely adjacent to and concentrical with a mold 10 to constitute the outer diameter of a mold cavity 10a. A mandrel 11 is introduced into said cavity, the outer diameter of which mandrel is smaller by the thickness of the desired sleeve 1 than the above mentioned inner diameter of said mold 10 and said thread sleeve 12. At its face end, said mandrel 11 has a substantially cylindrical ram, forming the front outlet opening of the conically ending gripping sleeve 1—the form part. An ejector 13 is illustrated engaging said thread-forming sleeve 12 and defining the rear end of the thread section 1a to be molded in the thread-forming section 12a of said thread-forming sleeve 12. Said ejector is axially movable and closely adjacent to and slidable on said mandrel 11.

Liquid plastics material is injected into the mold cavity of the arrangement illustrated in FIG. 4a.

After cooling, said first mold 10 is moved away from said gripping sleeve 1 by the separating movement E0 in +z direction according to FIG. 4b. Said translational movement does not cause any problems. Thereafter, said mandrel 11 is retracted in separating direction E1 according to FIG. 4c, said ejector 13 maintaining its position unchanged with respect to said thread-forming sleeve 12.

Finally, according to FIG. 4d, the finished gripping part 1 with its conical thread section 1a is ejected in forward direction by said ejector 13 with its removal direction E2, without any follower movement in a direction perpendicular to said ejection movement E2, which is a movement in +z direction, and without any turning movement being required, neither for said thread-forming part 12 nor for said gripping sleeve 1.

Due to the conical shape of said thread 1a, having at its right (inner) end a larger radius than at its left (outer) end, according to FIG. 2a, the separating movement of said thread may be effected in a short time without damaging the thread turns and thread webs.

The production process for an inner thread according to FIGS. 5a and 5c functions in a similar manner. A mold 20 with a mold cavity is provided as well which mold is closely arranged to an ejector block 22 at its face end according to FIG. 5a, thus defining the outer contour of said sleeve element 2 to be formed. A ram 21 is inserted into the mold cavity to determine a hollow space for the injection molding of said sleeve 2 between its outer surface and the inner surface of said mold 20. A thread-forming section 21a is provided on said ram 21, which section, in the inserted position, is located directly behind said ejector 22. If assembled in the described manner, the arrangement is ready to be filled with plastics material in an injection molding process as illustrated in FIG. 5a.

In the mold separating process, said mold 20, which does not cause any difficulties, is axially pushed off by movement F0, being a movement in +z direction.

Thereafter, said substantially solidified sleeve element 2 may be pushed off axially, also in +z direction, from said conical thread-forming section 21a, said block-shaped ejector 22 effecting an axial movement in F1 direction substantially corresponding to the length of said ram 21. It is also possible to retract said mandrel 21 in the same way, said block 22 remaining in its resting position, so that the separation of said sleeve 2 is obtained by a movement in –F1 direction. No radial movement is required to remove said sleeve element 2 from the mold, no turning or rotating movement of said sleeve 2 or of said mandrel 21 is applied, so that the removal may be effected safely, gently and rapidly.

The assembly of a gripping part 1 and a shaft part 2 is described in three steps in FIGS. 6a, 6b, and 6c. FIG. 6a shows the partly axial introducing of the conical outer thread 1a into the conical counter-thread (inner thread) 2a up to a distance corresponding to said thread pitch σ, when $α_{2'}=α_2$ being selected. Thereafter, in FIG. 6b, a turning or screwing movement is applied, which may be substantially one rotation, to bring all thread sections simultaneously into releasable engagement according to FIG. 6c. The assembly of sleeve parts 3 and 4 is effected in a similar manner: axially inserting up to a short remaining distance being σ when $α_{2'}=α_2$ being selected, and subsequent turning for releasable but firm securing. FIGS. 7a, 7b, and 7c may also be regarded such that the head or end piece 3 is screwed upon the free end of said sleeve 2 according to FIGS. 6a, 6b, and 6c so that a ball-point pen consists of three elements of sleeve-shaped nature, every two of which at a time are brought into engagement by the connection of conical threads. Said short remaining distance σ varies depending on the modification of $α_2$. It becomes smaller when $α_2$ becomes larger than $α_{2'}$.

FIG. 8 illustrates a conical thread, the thread forming part (the tool having a thread-forming section for an outer thread or an inner thread) being shown only by one single line 12a or 21a in the middle of FIG. 8.

(a) Above said line, a part of a sleeve HI with an inner thread is shown.

(b) Below said line 21a, a sleeve HA with an outer thread is shown.

Said sleeve HI with inner thread corresponds to FIGS. 5a, 5b, and 5c, the removal movement F1 being correspondingly shown also in FIG. 8. Said sleeve HA with outer thread corresponds to FIGS. 4a, 4b, 4c, and 4d, FIG. 8 also showing the removal movement E2 corresponding to FIGS. 4a, 4b, 4c, and 4d.

FIG. 8 illustrates the relations between a particular form tool projection (part of the tool which forms a recess in the inner or outer thread) and adjacent to said projection a form tool recess or undercut, which is responsible for the corresponding adjacent projection on the same above mentioned thread.

"X" designates all tool projections and recesses, "A" all outer thread projections and recesses and "I" all inner thread projections and recesses.

(a) For example, a form tool projection X1 produces a corresponding inner thread recess I1 in sleeve HI. Projection I2, which is adjacent in –z direction, is formed by the adjacent form tool recess X2 and the form tool projection X3, which is further adjacent to said form tool recess X2, forms the corresponding inner thread recess I3. A relation for the conical thread may be established between the next (following) inner thread projection I4

(resulting from the corresponding form tool recess X4) and the aforementioned form tool projection X1. In case the radial dimension of I4 is the same as that of X1, HI may be (easily) separated in removal direction F1 without I4 upon separation contacting a further tool projection except for the tool projection X3 forming I4. Instead, it passes all tool projections X1 and all tool projections located before (in removal direction +z) without contacting them.

The corresponding line L2 connecting all form tool projections X1,X3, . . . illustrates the angle $\alpha_2$ as described above.

(b) Similar to the above description for sleeve HI, the same removal movement E2 and the same relation may be established between a form tool recess X1 and the corresponding thread web A1 and a form tool projection X4 being spaced by more than one thread pitch $\sigma$ in direction E2. The connection of all form tool projections are located on a conical surface L1 marked by a dot-dash line.

A conical thread structure $\alpha_1, \alpha_2, t$ is provided to simplify the separation of threads in plastics sleeve elements 1,2,3,4 and to decrease production cost. The radial distance of the thread elements 50,60,51,61 of said thread structure and of the corresponding form tools, which elements being adjacent in translational z or –z direction, are dimensioned such that, when removed in direction E0,E1,E2 or F0,F1 from the mold each thread element "snaps out" only once and does not snap into a second time.

What is claimed is:

1. A manufacturing process for a writing instrument having at least two sleeve elements made of plastic material, wherein said elements are easily separable from at least two molds for forming them and are adapted to be releasably secured together, said process comprising the steps of:

(a) providing a series of first thread elements that are periodic in an axial direction on a slightly conical thread basic surface of a first of said sleeve elements by using a first tool contour associated with a first of said molds;

(b) providing a series of second thread elements that are periodic in said axial direction on a slightly counter-conical basic surface of a second of said sleeve elements by using a second tool contour associated with a second of the molds; wherein (c) an angle of inclination of at least one of said conical and counter-conical basic surfaces corresponds with a radial height of said thread elements such that during separation of one of said sleeve elements from the corresponding mold with substantially only axial movement, none of said thread elements fully lock into their associated tool contour of the mold; and (d) separating said at least two sleeve elements from said at least two molds.

2. The process of claim 1, comprising a little or no plastic deformation of the thread elements during separating said sleeve elements and said molds.

3. The process according to claim 1 wherein said separating of said sleeve element from said mold comprises demolding in a direction of an axis and effects an elastic deformation of said thread elements.

4. The process according to claim 1 wherein said thread elements are separated in a direction of an axis as one of webs, segments and points.

5. The process according to claim 1 wherein the separation of said thread elements is effected in only an axial direction without substantial radial follower motion.

6. The process according to claim 1 wherein said thread elements have rounded edges.

7. The sleeve elements produced according to claim 1, wherein said first and second thread elements of said sleeve elements comprise a plurality of bayonet-type thread elements that are circumferentially spaced with respect to each other and are located one after the other in an axial direction, at continuously offset radial levels on one of said basic surfaces.

8. The sleeve elements produced according to claim 1, wherein said first and second thread elements of said sleeve elements are provided with helical thread webs that are radially dimensioned such that, viewed in section, the projection of a first thread web of said first thread elements has a radial height that corresponds to a first thread web recess of said second thread elements.

\* \* \* \* \*